United States Patent [19]

Lhospice

[11] Patent Number: 4,685,782
[45] Date of Patent: Aug. 11, 1987

[54] SPECTACLES HAVING A DETACHABLE FRONT

[75] Inventor: Bernard Lhospice, Blois, France

[73] Assignee: Essilor International (Compagnie Generale d'Optique), Creteil Cedex, France

[21] Appl. No.: 903,859

[22] Filed: Aug. 29, 1986

Related U.S. Application Data

[63] Continuation of Ser. No. 592,913, Mar. 23, 1984, abandoned.

[30] Foreign Application Priority Data

Apr. 8, 1983 [FR] France ............................ 83 05761
Aug. 10, 1983 [FR] France ............................ 83 13170

[51] Int. Cl.⁴ ............................................. G02C 3/02
[52] U.S. Cl. ..................................... 351/130; 351/41; 351/47
[58] Field of Search ..................... 351/41, 44, 47, 57, 351/60, 130, 58, 62

[56] References Cited

U.S. PATENT DOCUMENTS

| | | | |
|---|---|---|---|
| 2,687,524 | 8/1954 | Mosher | 351/47 |
| 3,238,005 | 3/1966 | Petitto | 351/47 |
| 4,240,718 | 12/1980 | Wichers | 351/62 |
| 4,247,178 | 1/1981 | Cook | 351/58 |

Primary Examiner—Rodney B. Bovernick
Assistant Examiner—D. M. Dzierzynski
Attorney, Agent, or Firm—Burgess, Ryan & Wayne

[57] ABSTRACT

Spectacles formed by combining two separate parts, respectively, a support structure connected to spectacle temples and a detachable front.

A bridge of the front is adapted to be joined to the central part of the support structure connecting the two spectacle temples through the intermediary of a assembly element. Each of the edges of the front is adapted to be connected to the support structure close to its connection with the temples through the intermediary of a projecting assembly element cooperating with a holdback device and a housing.

Application to the realization of the connection of a front and a support structure ensuring good interlocking and insertion of the hooking elements in the overall aesthetic appeal of the spectacles.

11 Claims, 11 Drawing Figures

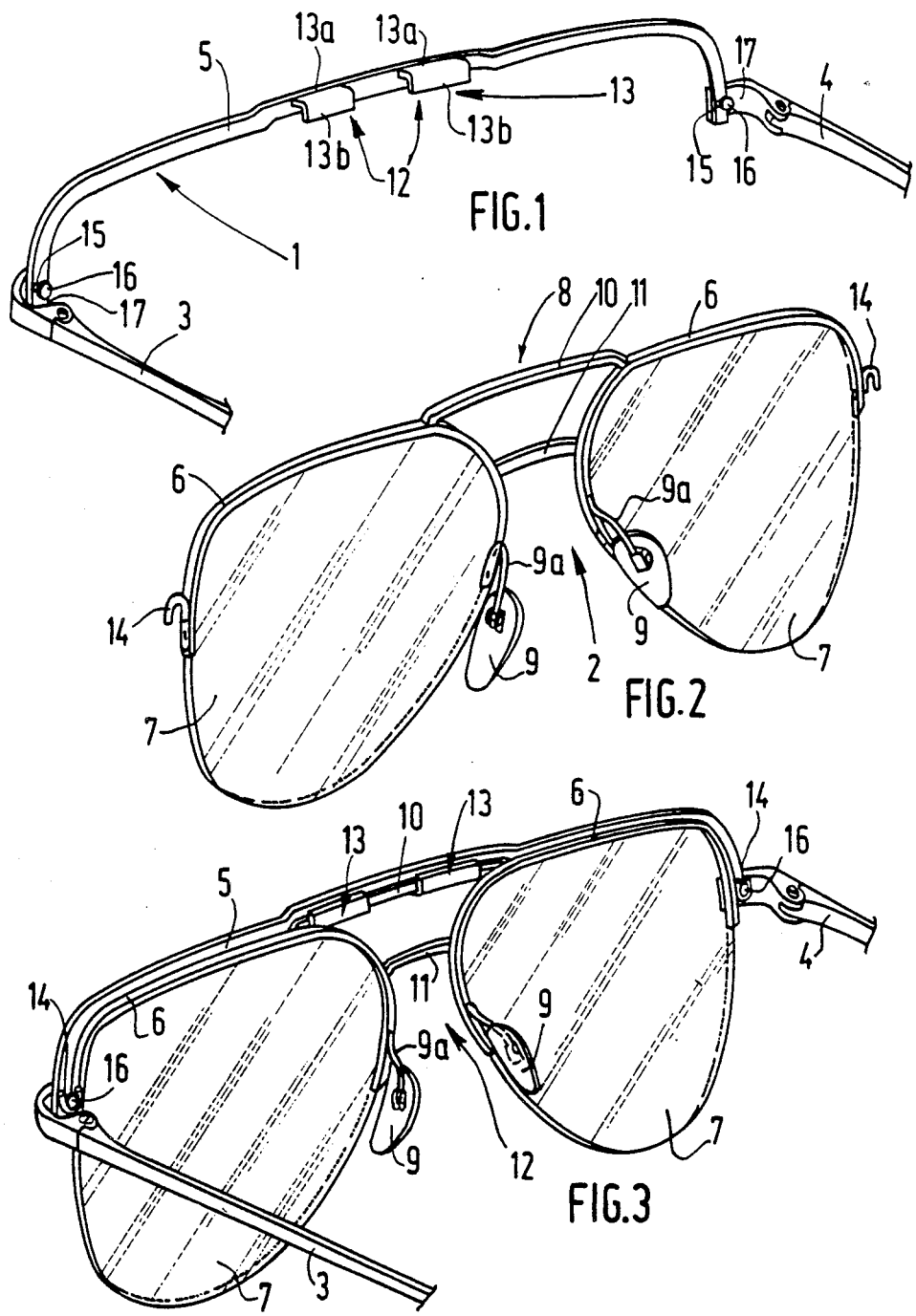

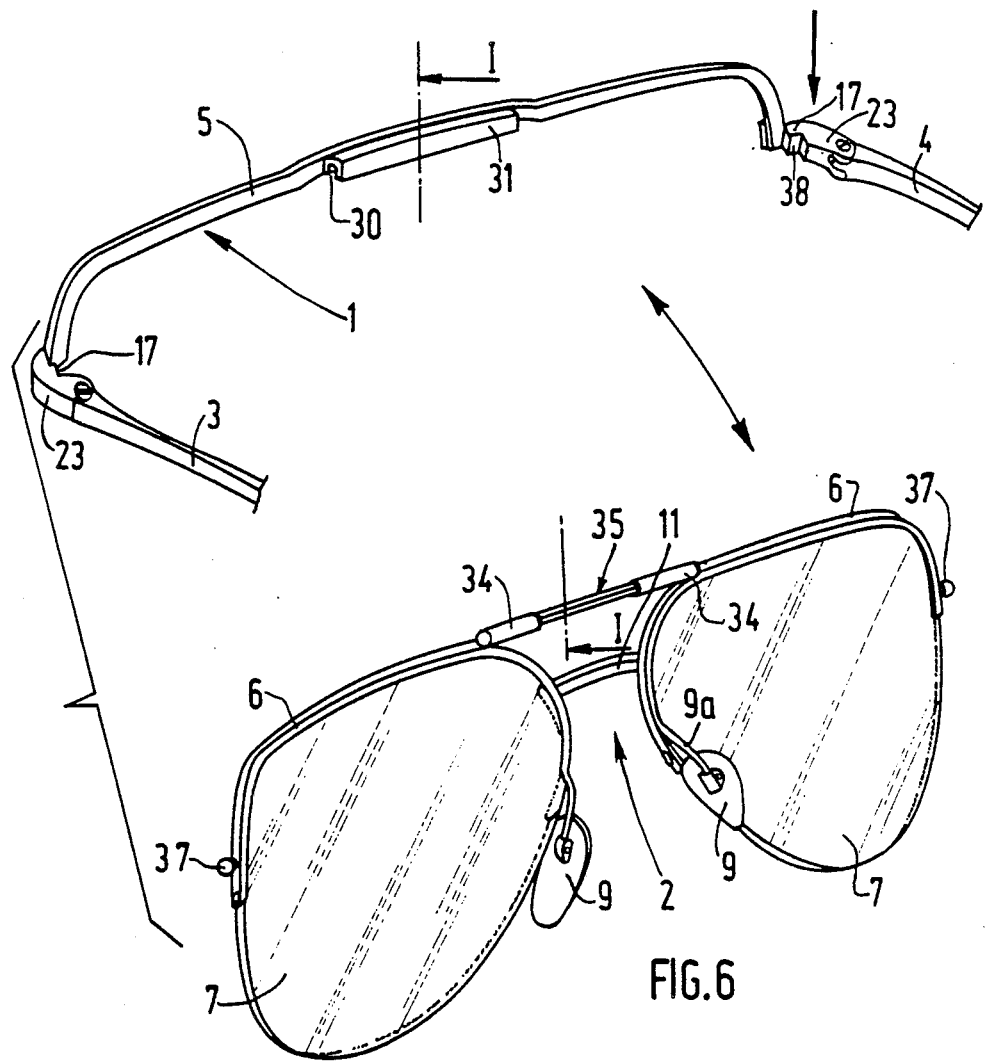
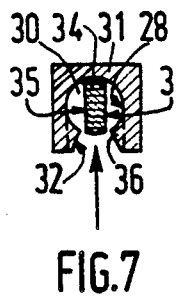
FIG.7
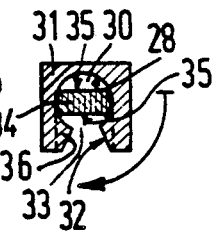
FIG.8
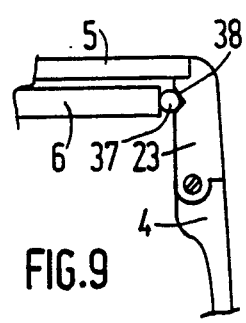
FIG.9

SPECTACLES HAVING A DETACHABLE FRONT

This application is a continuation, of application Ser. No. 592,913 now abandoned, filed Mar. 23, 1984.

BACKGROUND OF THE INVENTION

The present invention concerns a support structure for a spectacles front comprising two spectacle temples connected to a central bar and to which a front is intended to be assembled. It also concerns the front intended to be assembled to this support structure as well as the spectacles formed by the combination of this structure and this front.

DESCRIPTION OF THE PRIOR ART

The most serious drawbacks with respect to the spectacles formed of two assembled parts arise from the difficulties in mounting the two parts as well as the less than satisfactory aesthetic appeal of these types of spectacles. One of the aims of the present invention is to simplify the mounting of the two parts while improving the general aesthetic appeal of these types of spectacles.

The invention is also aimed at maintaining ease of mounting and ensuring a perfect and strong interlocking of the front on its support structure while allowing the stylist to realize more varied and distinct forms of spectacles.

SUMMARY OF THE INVENTION

The object of the present invention is a support structure comprising means to exert between the support structure and the front intended to be assembled to it, a relative elastic deformation ensuring the locking in position of the front and allowing at most a degree of freedom between the front and the structure, the means consisting of a first central hooking or engagement system disposed on the internal part of the structure and of second assembly elements disposed on the internal part of the bar close to the joints of the temples.

The first hooking system comprises at least one L-shaped or H-shaped element, forming a hook, that can comprise on at least one part of its length a groove of a generally circular section provided with a narrower inlet.

According to another embodiment, the second assembly elements consist of hooking means intended to receive interacting means of the front, means forming the housing being provided in the internal part of the ends of the bar in order to protect the interacting means.

The present invention also concerns the front intended to be assembled to a support structure such as described herein-above, that comprises spectacle eyewires on the lateral parts of which are disposed interacting means intended to be adapted to the hooking or engagement means of the said second assembly elements with which the support structure is provided.

The invention also concerns spectacles formed by combining two separable and detachable parts, respectively the support structure and the front such as described herein-above. According to one realization, the interacting parts of the front consist of an endpiece having a rounded head that cooperates with the second assembly means of the support structure consisting of hooking means forming the housing for the endpiece and the head.

According to another realization of the said spectacles, the front presents with respect to the support structure a degree of freedom by pivoting about the axis passing through the heads of the two endpieces.

BRIEF DESCRIPTION OF THE DRAWINGS

Other aims, advantages and characteristics of the invention will appear from reading through the description of various embodiments of the invention given by way of non-limitative illustration with reference to the annexed drawings in which:

FIGS. 1 and 2 are a view in perspective of two separated parts of the spectacles according to the invention, respectively, the support structure and the front, the temples of the structure being cut;

FIG. 3 is a view in perspective of the spectacles realized by assemblage of another embodiment of the two parts;

FIG. 6 is an exploded view in perspective in the same situation as FIGS. 1 and 2, and which represents another attachment manner of the two parts of the spectacles according to the invention;

FIGS. 7 and 8 represent, on a larger scale, a section along plane I of FIG. 6 of an assemblage detail of the two separated parts of the spectacles, FIG. 7 corresponding to the beginning of the assemblage and FIG. 8 to the situation of the final assemblage;

FIG. 9 is a view from above with torn away sections of the spectacles represented in FIG. 6 of an assemblage manner close to the joints of the temples;

FIGS. 1 and 2 represent separately, the two parts of the spectacles according to the invention, constituted by a support structure 1 and a front 2. The support structure comprises conventionally two temples 3 and 4 hinged on a median part or bar 5. Front 2 is formed of two spectacle eyewires 6, that are each adapted to receive a lens; the eyewires 6 are connected by a bridge 8 constituted, for example, by two horizontal bars, an upper hooking bar 10 and a lower nose rest 11. Nose rest pads 9 are each borne by a temple 9a fixed on each eyewire 6.

Figure 4:
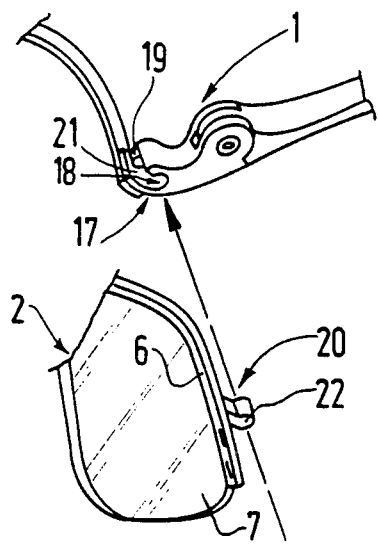
FIG. 4 is an exploded view in perspective, limited to the zone close to the joint of one temple and which represents yet another embodiment of the spectacles according to the invention.

The median part 5 of the support structure 1 comprises a first central hooking system 12 constituted by two L-shaped hold-back members or little bars 13 of which one wing 13a is fixed at the end on its internal part close to the middle of bar 5 of the support structure; the other wing 13b of the members or little bars 13 in assembly forms a U-shaped hook open towards the bottom. The spectacle eyewires 6 of the front each bear a projecting assembly element constituted by two hooking means 14, H-shaped and open in the same direction as the little bars or members 13, i.e. towards the bottom of FIG. 1. The little bars or members 13 can be oriented in a direction opposite that of the lenses 7, in the same way as the opening of U-shaped holding means 14. At each of the outside edges of the support structure 1 and at the level of the joints of temples 3 and 4, is fixed a nipple or stud 15 comprising at its free end an enlarged shoulder 16. Each stud 15 is surrounded by a housing 17 provided in the support structure 1 and intended to receive one of the hooks 14 so as to conceal it and blend it into the general aesthetic appeal of the spectacles.

In the embodiment represented in FIG. 3, the bar 5 member or little bar 13 assembly forms a U-shaped hook open towards the top and the U-shaped hooking means 14 are also open towards the top.

FIG. 3 shows how the assemblage of the front 2, equipped with its lenses 7, is presented on the support structure 1, it being understood that the embodiment of FIGS. 1 and 2 are assembled according to the same principle. In order to realize the two parts of the spectacles, the wearer can engage each U-shaped hooking means on the corresponding stud 15 by overlapping the shoulder 16 of this stud, then bending under stress front 2 in order to dispose the upper bar 10 of the bridge bearing on the part 13a of the little bars 13. After release of the stress on the front 2 and the structure 1, a residual elastic effort remains and ensures the rigid assembly of the two parts of the spectacles and their interlocking in position. It is therefore the combined elasticity of the support structure 1 and of the front 2 that acts as interlocking spring. This simple and advantageous disposition overcomes all the problems of housing and space, aesthetic appeal and strength of the interlocking spring that was indispensable at each assembly point in the known solutions of spectacles realized by detachable assembly of a front and a support structure. To disconnect the two parts of the spectacles, it is sufficient to proceed in the opposite order of steps.

In the embodiment of FIG. 4, the housing of the support structure is constituted by an opening 18 with abutments of bottom 19 that act as the studs 15 of FIGS. 1 to 3. The openings 18 are intended to receive a endpiece 20 integral with the temporal parts of the spectacle eyewire 6 of the front 2. To do this, the openings 18 are connected to a narrower lateral passage 21 open in the direction of the bridge 8 of the front. The enlarged external part 22 of the luf is housed in the opening 18 bearing on the abutment of bottom 19, while the narrower body of the endpiece 20 forming the connecting rod through-crosses the narrower lateral passage 21.

Figure 5:
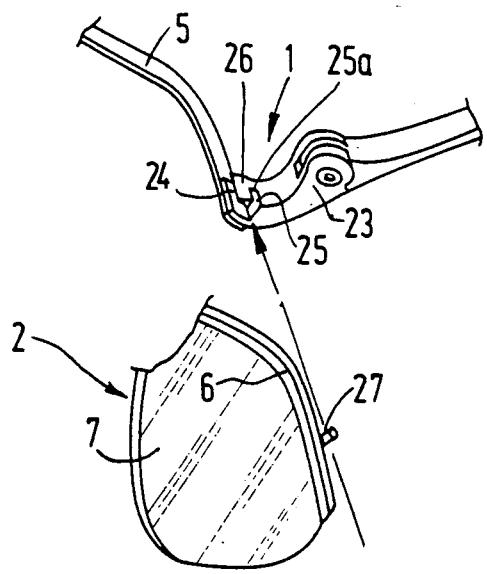
FIG. 5 represents in the same situation as FIG. 4, a further "bayonet-joint" embodiment of the spectacles according to the invention.

FIG. 5 represents a "bayonet type" slot or channel fulfilling the functions of opening 18 and that of guiding channel of the spectacle eyewire. The central part 5 of the support structure is connected to a jointed support 23 that presents a channel or a passage 24 parallel to the support structure and adapted to receive, in a controlled manner, the spectacle eyewire 6 of the front perpendicular to the temple 4. The passage 24 issues on a lateral passage open towards the outside and which surrounds and isolates locally from the rest of the support structure, a projection 26 intended to cooperate with an external catch-pin 27 fixed on the temple of the spectacle eyewire 6. The central part 5 of the support structure can be a metallic blade and the passage 24 parallel to the support structure is thus realized by welding an L-shaped metallic part to its end on the main part of the metallic blade constituting the central part 5 of the support structure. In this embodiment, the mounting of the front 2 on the support structure 1, is carried out substantially in the same way as previously described.

According to the embodiment represented in FIGS. 6 to 9, the support structure 1 presents a central part 5 provided with a longitudinal groove or open channel 30 the central section of which appears on FIGS. 8 and 9. This channel 30 can be provided directly in the central part 5 or indeed in a section 31 fixed on the temple of this central part. As can be seen on the larger scale sections of FIGS. 7 and 8, the channel 30 presents V-shaped inlet fronts 32 and a generally circular section that foresees a narrower inlet section 33, and the internal section of which constitutes a cylindrical bearing span 28.

In order to cooperate with the longitudinal channel 30, the upper bar of the bridge is provided on at least one part of its length, preferably close to its two ends, with a cylindrical swelling 34 penetrating freely into the channel 30 open at this site. On the central part of this swelling represented in FIGS. 7 and 8 is realized, for example, by slot milling, at least one surface forming a plane 35 that allows to introduce it into the opening 33 of the channel slot 30 when the front 2 is presented before the bridge 8 with the plane of the lenses 7 subtantially parallel to the plane of the temples 3, 4 as represented in FIG. 7.

By folding back the front 2 towards the bottom in the final assembly position of the front 2 on the support structure 1, the swelling 34 turns in the longitudinal channel 30 and is confined in this channel by the edges 36 of the opening 33, as illustrated on the section of FIG. 8. In order to complete the locking of the front 2 with respect to the jointed supports 23 of the temples, as illustrated in FIG. 2, a protuberant or projecting part is disposed on the lateral temple of the front 2, i.e. on the spectacle eyewire 6 and this protuberant part is made to cooperate with an interacting hollow, provided in the support 23. According to the solution represented in FIG. 9, the protuberant part is constituted by a sphere 37 welded on the temporal temple of the spectacle eyewire 6 and the hollow provided in the support 23 of the support structure 1 is a V-shaped channel 38. The protuberant or projecting part can be a rod or a stud welded to and/or implanted on the temporal temple of the spectacle eyewire 6 and the hollow of the support 23 is thus a channel or a hole having a larger opening than the diameter of the stud 39 mentioned herein-above.

According to the embodiment represented in FIGS. 6 to 9, the front and the support structure 1 are practically no longer subject to a considerable stress in assembly position but it is nevertheless the inherent elasticity of the face 2 and of the support structure 1 that constitutes the interlocking means 39.

Figure 10:
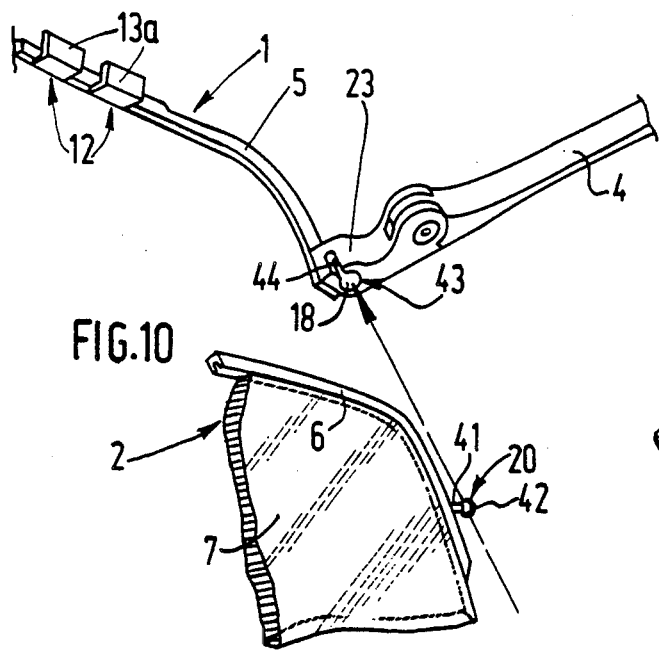
FIG. 10 is an exploded view in perspective, limited to the zone close to the joints of one temple of another embodiment of the spectacles according to the invention.
Figure 11:
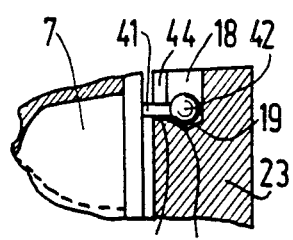
FIG. 11 represents, on a larger scale, a section of the assemblage detail of the two parts of the spectacles represented in FIG. 10.

FIG. 10 represents separately the two parts of the spectacles according to the invention, constituted by a support structure 1 and by a front 2. The two spectacle eyewires 6 each comprise a stud 20, formed by a connecting rod 41 integral with one of the spectacle eyewires and which bears on its free end a ball 42. The jointed support 23 comprises a housing 43 intended to receive the endpiece 20. This housing 43 is constituted, on the one hand, by an opening with open abutments at the bottom 19 (cf. FIG. 11), and, on the other hand, by a narrower lateral passage 44 open in the same direction as the opening 18.

In this embodiment, the opening 18 is a blind hole of a substantially cylindrical shape and diameter slightly larger than that of the ball 42 and the lateral passage 44 issues laterally into opening 18. The bottom of the blind hole 18 constitutes the abutment of bottom 19 on which bears the ball 42 when it is introduced with its connecting rod 41 into the housing 43.

According to various embodiments, the bottom 19 of the blind hole 19 acting as bottom abutment for the ball can present a hemispherical or conical form 45 fitting the external surface of the ball 42. In mounting position of the endpiece 20 in its housing 43, it can be foreseen that only the ball 42 enters in contact with the bottom 19 but that, in such a case, the connecting rod 41 undergoes a bending which generally causes it to bear on at least one part of the bottom 46 of the lateral passage 44.

As concerns the ball 42, various means that are efficient but also increasingly costly are possible in order to ensure its attachment to the connecting rod 41. The ball can come in a single piece, preferably produced by hot or cold forging or molding, with the connecting rod 41 that is generally welded to one of the eyewires or surrounds 6 of the lenses 7. The ball 42 can also be set into the connecting rod 41 by welding or any other means such as end riveting. According to a more expensive embodiment, the ball 42 can be pierced with a bore that is engaged in soft rubbing on an axis of the connecting rod 41, in such a way that the ball 42 can turn on the axis of the connecting rod along a theoretical pivoting axis of the front 2 passing through the centre of the two balls 42 mounted at each of the two ends of this front. Such a relatively more expensive disposition realization can be justified when it is required to facilitate the pivoting of the front finally about this theoretical axis and to reduce wear of the abutment of bottom 19 upon contact with the ball 42.

The spectacles according to this latter embodiment are obtained from a mounting much easier than those according to the preceding embodiments while maintaining perfect interlocking.

It must be noted that according to the various embodiment described to realize, on the one hand the bridge and the spectacle eyewires 6 of the front 2 and, on the other hand, the central part of the support structure 1, many various materials of aesthetic appeal and resistance can be used. If it is required to obtain a maximal locking spring effect that is easy to operate, it is appropriate to use, for these parts of the spectacles, structures which, on the one hand, present a good deformation capacity in order to clear the locking edges constituted by the wings 13a or 13b of the little bars 13 and, on the other hand, supply a substantial reaction effort in order to ensure good locking of the assembly. Such resilient and deformable structures can be obtained either through the utilization of a very resistant material, such as thin-sheet steel, to allow its deformation, or by the utilization of a relatively elastic material such as hollow section plastic material presenting larger dimensions, these two principal options giving very different aesthetic results.

Of course the present invention is in no way limited to the embodiments described and represented, and it can be adapted to numerous variants available to the man skilled in the art, without departing from the spirit and scope of the invention.

Thus, for example, whatever the embodiment realized, the front can be formed of two independent eyewires, in which case each of the eyewires is to be itself considered as a front. In this case, on the one hand, the support structure will comprise two first central hooking systems, in which the interacting means of each of the eyewires (or face) will be housed. On the other hand, the support structure will comprise central means able to form a bridge, provided with third assembly elements, of the same type as the second assembly elements disposed on the internal part of the bar. The eyewires (or face) will, of course, be provided with interacting assembly means, on the one hand, to the said second means disposed on the lower part of the bar and to the said third assembly means.

I claim:

1. A disassemblable spectacle frame comprising a support frame comprising a central support means supporting a first connecting means, and two secured second connecting means located near the lateral ends of the support frame adjacent to a hinge means between the support frame and a temple; a lens frame engageable with the support frame, comprising two lens holding elements, a median element connected between the two lens holding elements and stud means, with an enlarged terminal portion, arranged to engage the second connecting means of the support frame, the first connecting means comprising at least one open channel element adapted to receive the median element of the lens frame, the second connecting means comprising a housing, having an opening open at an end for receiving the stud means, the open end facing a direction opposite to the direction of the opening of the channel element wherein the first and second connecting means being adapted to urgingly engage the first connecting means with the median element and the second connecting means with the stud means through relative deformation of the support frame and the lens frame.

2. A spectacle of claim 1 wherein the channel element is an L shaped element.

3. A spectacle of claim 1 wherein the channel element is a U shaped element.

4. A spectacle frame of claim 1 wherein the stud means comprises a ball at the end of a connecting piece mounted at a lateral portion of the lens frame and projecting laterally therefrom and the housing comprises a lateral passage for the connecting piece when the ball enters the housing.

5. A spectacle frame of claim 4 wherein the opening in the housing further comprises a conical abutment for engagement with the ball.

6. A spectacle frame of claim 5 wherein the conical abutment is arranged to permit the relative deformation of the support frame and the lens frame after assembly of the spectacles.

7. A spectacle frame of claim 4 wherein the ball and connecting piece are molded as one piece.

8. A spectacle of claim 4 wherein the ball is riveted to the connecting piece.

9. A spectacle of claim 4 wherein the ball is welded to the connecting piece.

10. A spectacle of claim 4 wherein the ball of the stud means is bored and mounted with a low frictional enegagement on the connecting piece the ball being free to rotate around the axis of the connecting piece.

11. A spectacle frame of claim 1 in which each housing is open on the side toward the lens frame to provide an end slot and opening to engage a catchpin on the lens frame comprising the stud means.

* * * * *